United States Patent

[11] 3,610,447

[72] Inventor Philip J. Ortiz
 Railroad Avenue, Hopewell Junction, N.Y. 12533
[21] Appl. No. 860,925
[22] Filed Sept. 25, 1969
[45] Patented Oct. 5, 1971

[54] RIGID STAND-OFF CONNECTOR COUPLING FOR A VEHICLE TOW BAR
 5 Claims, 4 Drawing Figs.
[52] U.S. Cl. .................................................. 214/86 A,
 280/480, 280/493, 280/402
[51] Int. Cl. ..................................................... B60p 3/12
[50] Field of Search .......................................... 214/86 A;
 280/480, 493

[56] References Cited
UNITED STATES PATENTS

| | | | |
|---|---|---|---|
| 1,594,305 | 7/1926 | Lattin ........................... | 280/480 X |
| 2,417,871 | 3/1947 | Heuerman .................... | 280/493 X |
| 2,555,663 | 6/1951 | Schouboe ..................... | 214/86 A |
| 2,712,877 | 7/1955 | Wiley ........................... | 280/480 X |
| 3,271,049 | 9/1966 | Schoonmaker et al. ..... | 280/480 X |
| 3,285,443 | 11/1966 | Gaumont ..................... | 214/86 A |

*Primary Examiner*—Albert J. Makay
*Attorney*—Alfred E. Miller

ABSTRACT: A pair of connecting pipes each having one end abutting an operative dependent element of a tow bar, and the other end operatively connected to the lower A-frame of a vehicle to thereby maintain the tow bar at a predetermined distance from the vehicle when tension chains are passed through the pipes and connected to the A-frame and tow bar respectively. This arrangement prevents damage to bumpers, underpans and cowlings of automobiles, resulting from previous towing apparatus, due to the tow bar being directly held against a portion of the vehicle.

INVENTOR
PHILIP J. ORTIZ

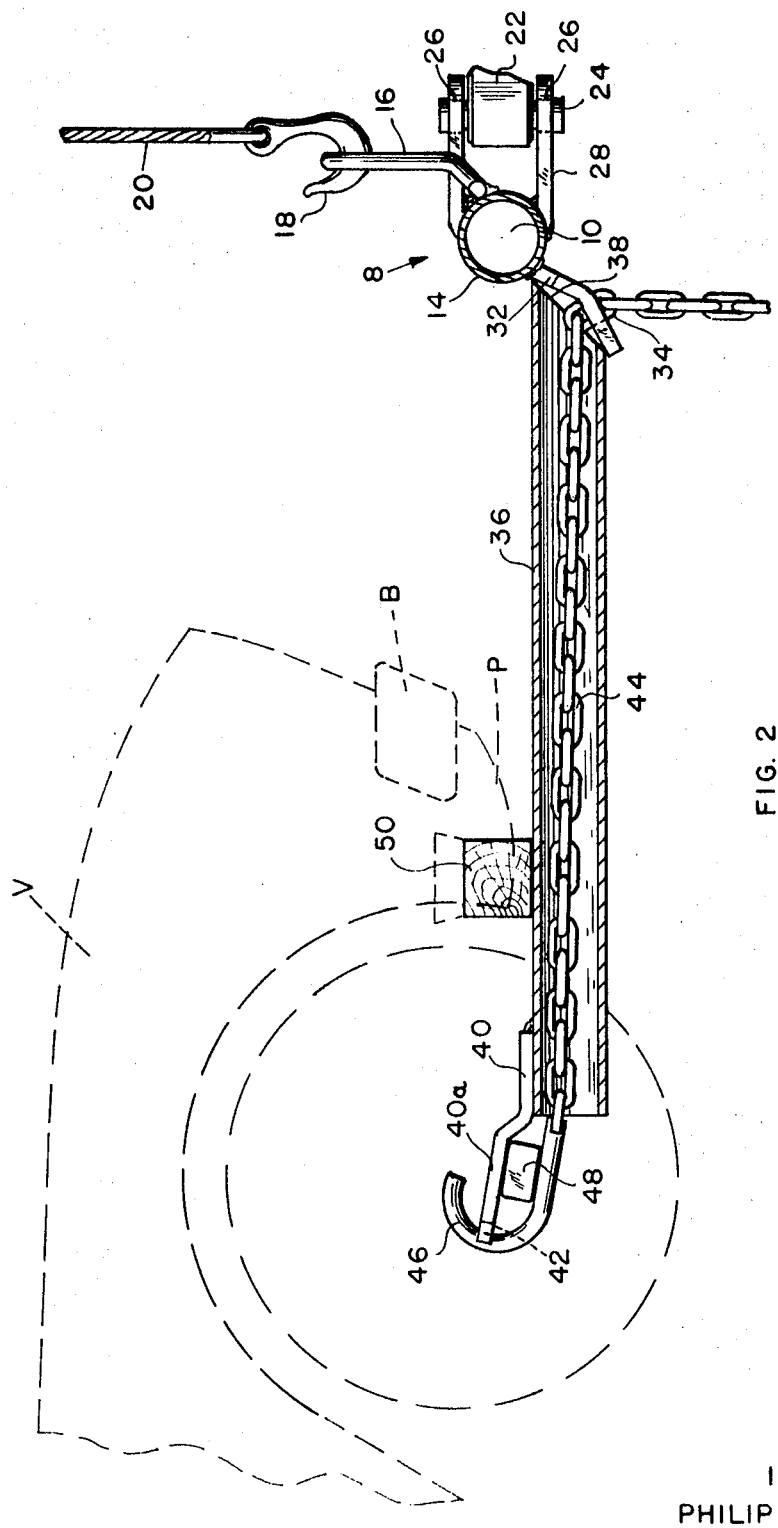

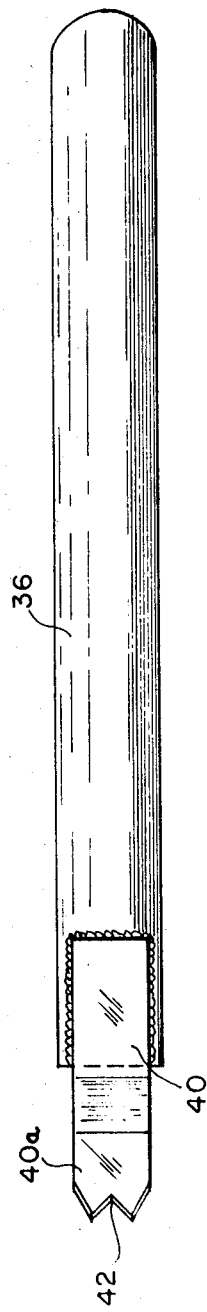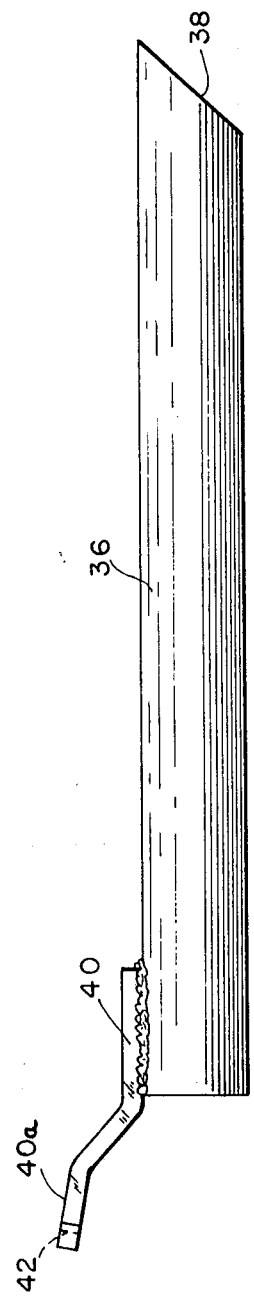

RIGID STAND-OFF CONNECTOR COUPLING FOR A VEHICLE TOW BAR

BACKGROUND OF THE INVENTION

Tow bars of the type shown in the present invention have become widely used by garagemen, service station operators and other service shops. Even though this tow bar is a successful design there are occasions when the tow bar may cause some minor damage to automobiles of modern design in which the bumpers have slanted surfaces and the underpans are shaped and painted. Thus, in order to avoid the situation in which the tow bar is brought into direct engagement with bumpers or underpans, or both, of a vehicle, the present invention is directed to a structure incorporating elongated pipe members which are connected between the tow bar and the undercarriage of the vehicle thereby resulting in the tow bar being spaced from the towed vehicle but also rigidly interconnected therewith. In addition, and for further protection, a spacing member, such as a wooden beam, is placed on the pipe members and has the undercarriage of the vehicle resting thereon.

Tension chains are utilized with each of the pipe members to connect the pipe member, at one end of the undercarriage and the other end to the adjacent depending ear of the tow bar. Since each of the depending ears have keyhole slots therein, the tension chain in each pipe may be pulled taut and the appropriate link of the chain dropped into the corresponding keyhole slot. In this manner, the pipe members and the tension chains combine to function as a rigid coupling device between the tow bar and the undercarriage of a disabled vehicle.

The rigid standoff connector constructed in accordance with the teachings of the present invention is relatively inexpensive, easily assembled and disassembled, and generally reliably effective for the purposes intended.

The invention will now be more fully described with reference to the accompanying drawings in which:

FIG. 2 is a side elevation view thereof as well as the lower A-frame and showing the towed vehicle in dotted lines;

FIG. 3 is a top plan view of one of the elongated pipe connectors showing the dog extend from one end thereof; and FIG. 4 is a side elevation view of the elongated pipe connector of FIG. 3, and additionally illustrating the bevel at the other end of the pipe.

DESCRIPTION OF THE PREFERRED EMBODIMENT

Figure 1:
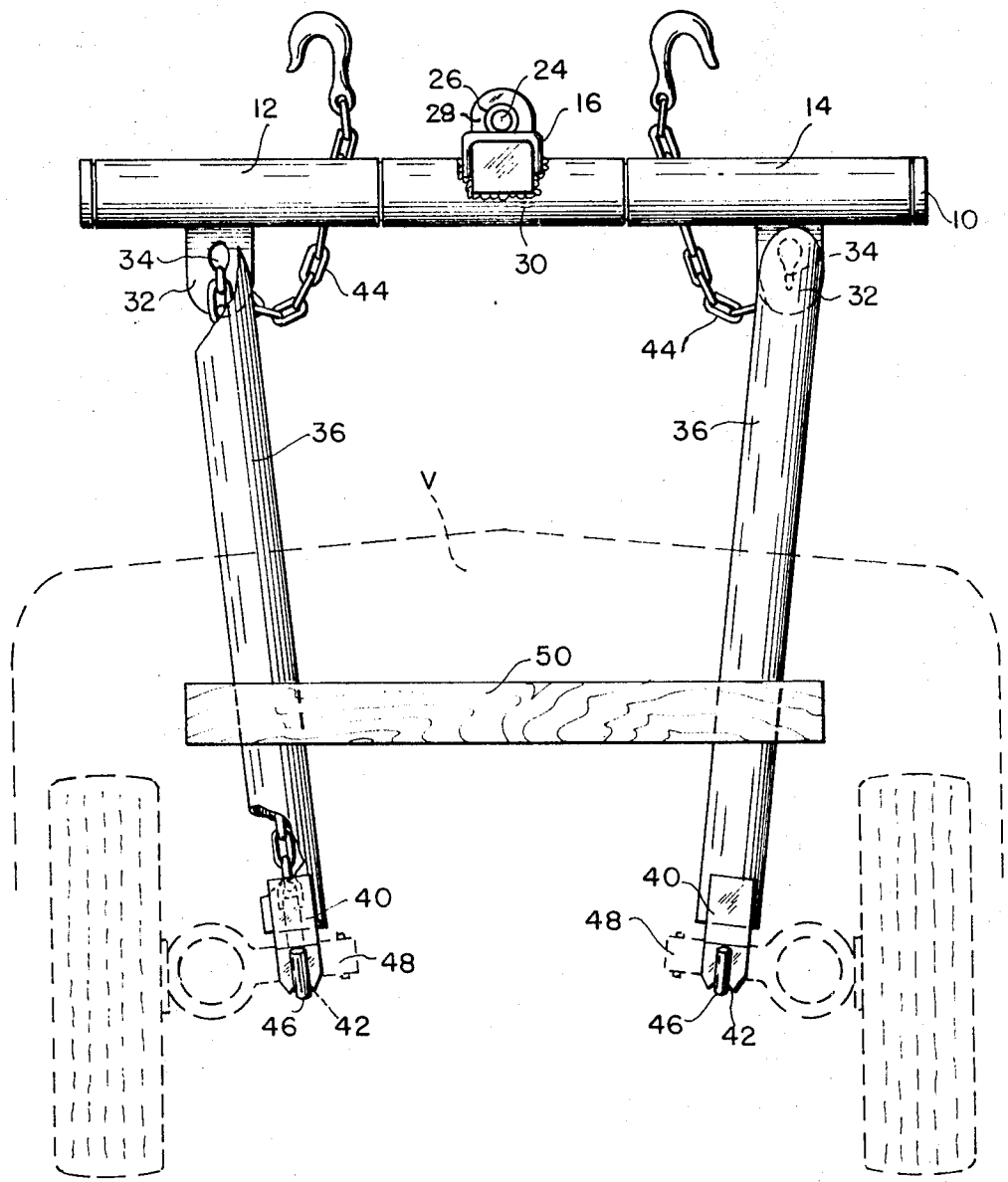
FIG. 1 is a top plan view of the rigid standoff elongated pipe connectors for a vehicle tow bar with tension chains, constructed in accordance with the teachings of the present invention, showing the same applied to a vehicle, and having parts thereof broken away for purposes of clarity.

A vehicle-towing device directed to a tow bar of the type contemplated for use with the present invention is disclosed in U.S. Pat. No. 2,795,435, issued June 11, 1957, in which applicant is a coinventor. However, it should be understood that the present invention is not restricted to use with a tow bar of the type shown and disclosed in the above-noted patent but that other rigid tow bars may function with the rigid standoff connectors and chains constituting the present invention.

The tow bar, referred to generally by the numeral 8, is pivotally secured to the back of a tow truck (not shown) and includes a rod 10 upon which sleeves 12 and 14 are rotatable. An offset, U-shaped connecting loop 16 is shown mounted on the rod and to which a hook 18 of the hoist 20 is connected. The hoist is a cable which is operated by a well-known, electrically operated, winch (not shown) on the tow truck for hoisting the disabled vehicle to a towing position. The tow bar 8 is pivotally connected to an elongated member 22 by means of a pin 24 inserted through the apertures 26 in the ears 28 mounted on the attachment member 30 located between the sleeves 12 and 14. Each sleeve 12 and 14 is provided with a depending latching member 32 having a keyhole-shaped aperture 34. The tow bar, as described, is disclosed in the aforesaid U.S. Pat. No. 2,795,435, and forms no part of the present invention.

As seen in FIGS. 1 and 2, two elongated pipes 36 are shown which function as rigid standoff connectors or couplers for the tow bar 8. Both of the pipes 36 are identical and each is provided at one end with a bevel 38 and at the other end with a dog 40 having a V-shaped notch 42. The dogs 40 are preferably flat stock welded to the pipes 36 and having offset portions 40a (FIGS. 3 and 4).

A tension chain 44 is passed through each pipe 36. One end of each chain is provided with a heavy-duty hook 46 which is adapted to hook into the V-shaped notch 42 of the dog 40 with the lower A-frame 48 of the vehicle V securely held between the shank of the hook 46 and bottom face of offset portion 40a of the dog 40. Preferably, an elongated wooden beam 50 is placed between the pipes 36 and a sturdy part of the undercarriage of the vehicle V in order to maintain the underpan P and the bumper B of the vehicle separated from contact with the pipes 36 and the tow bar 8, thereby preventing damage to these parts when the vehicle is being towed.

The rigid, standoff, elongated pipe connectors are installed in the following manner: The tow truck is backed up to a short distance from the vehicle bumper, and the tow bar 8 is lowered so that the rod 10 and rotatable sleeves 12 and 14 are positioned approximately parallel to the ground. Each of the pipes 36 is placed with the bevel 38 engaging and abutting the adjacent locking member 32 on the tow bar. The undersurface of the dog 40 at the other end of each of the pipes 36 is placed over the A-frame 48 of the vehicle V. The wooden beam 50 is then put in the proper location between the pipes 36 and a sturdy part of the undercarriage of the vehicle V. Thereafter, the tension chains 44 are passed through the pipes 36 with the hooks 46 engaging the V-shaped notches 42 with the A-frame 48 securely held between the shanks of the hooks 46 and the adjacent dogs 40. The tension or coupling chains 44 are then pulled tight and the appropriate links thereof drop by gravity into the reduced portions of the keyhole-shaped apertures 34. The winch is then activated and the tow bar 8 elevated thereby elevating the vehicle V by means of the tension chains in the rigid standoff connectors. In this manner, a vehicle can be towed safely, with bumpers, underpans, cowlings and fenders free from damage caused by the towing vehicle.

What I claim is:

1. In combination with a vehicle tow bar having spaced latching members a rigid standoff connector assembly comprising: a pair of spaced elongated pipes each being provided with an extension piece at one end thereof, said extension piece being adapted to abut a selected portion of the underframe of a disabled vehicle, the other end of each of said pipes being adapted to abut an adjacent latching member connected to said tow bar, a tension chain passing through each of said pipes and having a connecting member at one end thereof, said connecting member latching to said extension piece in a manner whereby together said portion of the underframe is surrounded and tightly engaged thereby, and at least a part of said chains being held taut within respective pipes with a portion of each chain being connected to the respective latching member of said tow bar.

2. The combination of claim 1 wherein said latching members depend from said tow bar and each is provided with a keyhole slot, and said other end of each of said pipes is bevelled and engages the respective latching member.

3. The combination of claim 1 wherein each of said extension pieces is a generally flat plate provided with a notch at the free end thereof, and the connecting member at one end of each of said tension chains is a hook which is adapted to be inserted in said notch.

4. The combination of claim 1 further comprising a block-shaped separating member positioned between said pipes and a selected part of the undercarriage of the disabled vehicle.

5. The combination of claim 3 wherein said flat plate extension piece has a part welded to said pipe and another part offset, said offset part being provided with said notch.